Patented Mar. 13, 1934

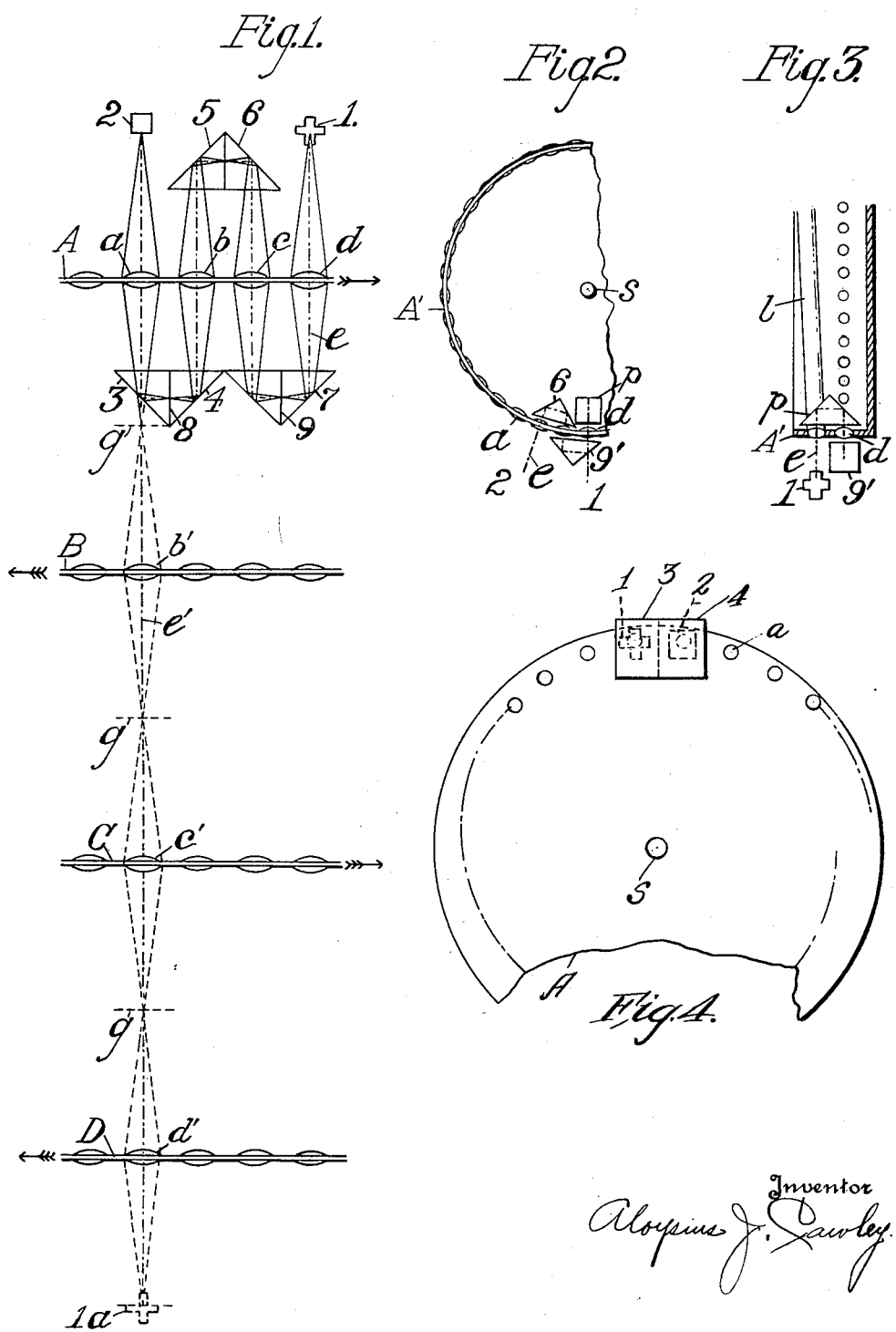

1,950,482

UNITED STATES PATENT OFFICE 1,950,482

REFLEX OPTICAL LEVER

Aloysius J. Cawley, Pittston, Pa.

Application February 4, 1931, Serial No. 513,373

21 Claims. (Cl. 178—6)

The invention relates to television apparatus. More particularly, it is concerned with a scanning apparatus by means of which an image is made of an object, and is caused to traverse a light sensitive device or screen at a speed which is considerably greater than the speed of the moving elements that accomplish this scanning.

The principles underlying the invention are applicable to practically all television processes employing a plurality of rotating elements, the object of the invention being to reduce the plurality of rotating elements to a single rotating medium bearing a number of separate groups of optical elements. The light beam is passed through one of those groups and reflected back through another group, reflected in turn back through another group and so on.

This application is a continuation-in-part application of my application Serial Number 473,660, for Scanning apparatus, filed August 7, 1930. Its purpose is to show the adaptability of the principles disclosed therein to the so-called "optic lever", which is disclosed in U. S. Patent 1,707,935 of August 2, 1929. Such an adaptation results in the accomplishment of the same results as obtained by the invention disclosed in the above patent, but with the elimination of all but one of the rotating media. Consequently, a much cheaper, compact and efficient apparatus is produced, the elimination of the disks, shafts and gearing resulting in greater speed with the same power.

I attain these objects by the mechanism illustrated in the accompanying drawing, in which, like reference characters have similar meanings and in which, Figure 1 is a plan view of my apparatus, also illustrating the elements which have been eliminated and which are covered by the above mentioned patent.

Figure 2 is a plan view of a modification employing a rotating cylinder.

Figure 3 is a cross-sectional view of a further modification of the invention.

Fig. 4 is an elevational view of one modification of the invention.

In Figure 1 the "optic lever", as described in the above patent, is illustrated together with my modification of it, which results in the elimination of most of the apparatus therein disclosed. In order to more clearly demonstrate the invention, Figure 1 is a view of the apparatus that would be obtained by viewing it slightly to the left of the optic axis and down below the plane of the paper, of the illustration given in Figure 1 of the above patent. This brings out more clearly the scanning of the lines transversely. As described in the patent, A, B, C and D are rotating disks, or other rotating media. Each carries a series of lenses $a$, $b'$, $c'$ and $d'$. Lens $d'$ forms an image of the object $1a$ on ground glass screen $g$. The optic axis is shown at $e'$. This lens is moved by the medium D to the left, and consequently the image also moves. Lens $c'$, moved by disk C to the right will reproject this image on the next ground glass $g$. This image moves at a greater speed than that formed by lens $d'$. Lens $b'$, moved by disk B to the left, reprojects the image upon ground glass or other screen $g$ and moves it at a still greater rate of speed. Similarly, lens $a$, moved by disk A to the right reprojects the image on the aperture of a photoelectric cell 2, or screen or other. This image moves at a speed equal to about four times that of disk A. The above description is that given in the above U. S. patent.

Any number of elements A, B, C, D, etc., may be used, to arrive at a corresponding increase of speed of the moving image. It is my purpose to obtain any desired increase of speed by the use of but one scanning disk, such as A, it only being necessary to add a reflecting means for each increase of the speed desired. Instead of the single disk any other type of rotating medium, such as a cylinder, may be used. A ribbon bearing lenses may also be used. In Figure 1 it will be seen that disk A does the work of all disks illustrated by the mere substitution of prisms, such as 3, 4, etc. In my invention, the object is shown at 1, and an image of it is formed which is projected into prism 7, which preferably has silvered reflecting surfaces. The prism reflects the projected image to the left, where it is focussed upon the surface of the prism 9. This surface may or may not be ground, as it serves the purpose of ground glass $g$. The optic axis $e$ is shown turned to the left by the reflecting means. Prism 7 has another prism in close contact with it, the two forming a larger right-angled prism. As 9 serves the same purpose as screen or ground glass $g$, and as the above patent states that $g$ may be omitted if desired, the reflecting means may consist of one large prism instead of two placed in contact. As lens $d$ moves to the right, it will be seen that the image moves from top to bottom of surface 9. Lens $c$ will reproject the image formed on 9 into prism $g$ above. However, this lens, in its motion to the right, will explore the image on 9 from bottom to top. There is, according to the above patent, an increase of speed of movement of the image. Prism 6 reflects the projected image to the left upon surface in contact with the adjacent prism 5. Since c is moving to the right the motion of the projected image upon the surface between 5 and 6 is from top to bottom. Its speed of motion is again increased over that of the original image projected upon 9. Lens b, also moving to the right, explores this image from bottom to top, and reprojects it into prism 4, whence it is reflected to surface 8, over which it moves at a speed that is still greater than the original scanning speed. The movement of the image on surface 8 is from bottom to top. Lens a, moving to the right, explores the image on surface 8 from top to bottom, and reprojects it upon the aperture of the photoelectric cell 2, or other object. The motion of the image over this aperture is four times the speed of the image over surface 9. Thus, all of the advantages of the "optic lever" are obtained with but a single rotating medium, whether it be disk, cylinder, or any other.

Instead of utilizing prisms made up of two adjacent prisms, such as 3 and 4, a single prism may be used. The only object of using two prisms is to obtain a screen or its equivalent such as 8. The surface of one of the prisms may be ground if desired, but their unground surfaces will act as a screen. However, as a screen is really not absolutely necessary, it may be omitted, and a single large prism used.

Instead of using the prisms as a reflecting means, since an objection may be raised against their possible light absorption, mirrors, such as silvered glass, polished metal, etc., may be used, it being only necessary to incline them in accordance with the reflecting surfaces of the prisms shown. In conjunction with them, ground glass or other suitable screens may be set up in the positions 8, if desired.

In practice, it has been found that very good results are obtained by placing the reflecting elements such as 3, 4, 7, etc., at a greater distance from the disk A than indicated in the drawing, i. e., at a distance which is apparently theoretically greater than that necessary to focus the image in the plane 8. The invention is not by any means limited to this distance, however, as any satisfactory distance may be used.

Any type of rotating media may be used, whether cylinders, disks, tapes, or the like.

It is to be noted that the lenses a, b, c, d may be arranged in a spiral or helix, as shown at 1 in Figure 2 of the above patent. In such case, the scanning lines will shift their position transversely to the direction of the lines themselves. Thus, an extra scanning cylinder or other medium is unnecessary. However, if it is desired to use a separate element for accomplishing the lateral movement of the series of images, this may be accomplished without actually adding an additional rotating member. This is accomplished in accordance with the principles laid down in my above mentioned application, whereby another optical element is added to the rotating medium. This is illustrated in Figures 2 and 3 of the drawing. In Figure 2, A' is a cylinder having a series of lenses a, d, etc., on its surface. It rotates on shaft s. To one side of the cylindrical surface there is placed a cylindrical lens l arranged in the form of a helix. This helix makes a complete turn with the turning of the drum A'. The object which is located at 1 passes its light into the transversely placed prism p. However, before this light strikes p it traverses cylindrical lens l (better shown in Figure 3). Due to its helical arrangement, this lens is constantly shifting its position laterally. Prism p reflects the light from lens l into lens d of the series of spherical lenses. The light then passes into prism 9', in which it forms its image in accordance with the principles laid down in connection with the description of Figure 1. Also in accordance with those principles, this image is explored and reprojected into prism 6 through an adjacent lens by the action of the prism 9'. The lateral motion of the light image is increased in accordance with the principles already laid down. The image formed in prism 6 is reprojected and explored in a direction opposite to its motion by the next in order lens. The final image is projected at 2 where may be located a screen or photoelectric cell or the like.

Figure 3 shows a cross section of the cylinder A' made just in front of the prism p. It shows the light from object 1 passing through the cylindrical lens l into the prism p, from whence it is reflected down through the spherical lens d into the first of the series of speed increasing prisms 9'. The circle of spherical lenses is clearly shown. Of course, as before mentioned, those lenses may be arranged in the form of a spiral or helix, according as to whether a disk or cylinder is used. In such case, the cylindrical lens l may be eliminated.

The lenses may be replaced by spherical hollow mirrors which have the power of producing images.

Figure 4 is an elevational view of a lens disk A showing the lenses a, etc., arranged in a spiral or stepped arrangement on the disk. 1 is the object, while 3 and 4 are two glass or other transparent reflecting prisms, which act to reflect the light back through an adjacent lens. 4 is the photoelectric cell or screen upon which the image is projected.

By the term "image forming element" as used in the appended claims is meant any optical element, such as a spherical lens, which will form a complete image without the aid of any other element. A slit for instance does not form a complete image.

The expressions "light receiving element" and "light receiving means" used in the appended claims designate, for instance, a photoelectric cell, a screen, objects or persons.

Having described my invention, I claim as new and desire to secure by Letters Patent:

1. The process of scanning which consists of successively producing and laterally moving an image, reflecting said image upon a plane whereon it moves in a definite direction, successively reprojecting said image while exploring it in a direction opposite to the lateral motion of said image upon a second plane, in order that it may move over said second plane at an augmented speed.

2. The process of scanning, consisting of successively projecting an image in a definite direction, transversely moving said image, reflecting said image upon a plane parallel to said direction whereon it moves, reflecting the light from said image in a direction parallel to the original direction of projection, exploring the light from said image in a direction opposite to the motion of said image and reprojecting said image upon a second plane whereon it moves at an augmented speed.

3. A scanning apparatus consisting of a rotatable element bearing a plurality of image forming and moving means which successively form an image of an object; a screen, stationary reflecting means for reflecting said image upon said screen and for reflecting the light from said image back through an adjacent member of said image forming means, in order that said adjacent image forming means may explore said image in a direction opposite to its motion and reproject said image upon a photo sensitive surface.

4. A scanning apparatus consisting of a movable element bearing a series of image forming means, a screen, stationary light reflecting means adjacent said moving element for reflecting the light from the successively formed and moved images back through adjacent image forming means wherein it is explored in a direction opposite to the motion of said image and wherein said image is reprojected and moved upon said screen.

5. A scanning apparatus consisting of a movable element bearing a series of image forming means arranged in stepped relation, a stationary light reflecting means adjacent said moving element for reflecting the light from the successively formed and moved images back through adjacent image forming means wherein it is explored in a direction opposite to the motion of said image and wherein said image is reprojected and moved laterally and vertically and a photoelectric cell upon which said image is projected.

6. A scanning apparatus consisting of an image casting device consisting of a plurality of image forming elements on a rotatable member, said elements successively forming and moving a series of images, said elements being arranged in stepped relation, stationary reflecting means for reflecting the light from said images back into a neighboring one of said image forming elements in order that it may be explored in a direction opposite to the motion of said image and reprojected and a photoelectric cell upon which said image is projected.

7. A scanning apparatus consisting of a movable element bearing a plurality of image forming means and a helical or spiral cylindrical lens and a plurality of stationary reflecting means, said image forming means acting to project and move an image, one of said reflecting means acting to reflect said image back through an adjacent image forming means where it is oppositely explored and reprojected to a second reflecting means which reflects through a helically or spirally arranged cylindrical lens upon a screen or photoelectric cell whereon it is moved in different directions at different speeds.

8. The process of scanning which consists of successively producing and laterally moving an image, reflecting said image upon a plane whereon it moves in a definite direction, successively reprojecting said image while exploring it in a direction opposite to the lateral motion of said image, progressively and periodically varying the direction of projection of said image in order that said image may be projected upon a screen or plane and possess two motions at right angles to each other and of varying degree.

9. A scanning apparatus consisting of a rotatable disk provided with a plurality of spherical lenses spirally arranged, a stationary reflecting prism having its largest face parallel to said disk said face having a length that substantially equals the area covered by two successive ones of said lenses.

10. A scanning apparatus consisting of a rotatable cylinder carrying a plurality of spherical lenses arranged in a helix and a stationary reflecting prism arranged adjacent said lenses for reflecting the light passing through one of said lenses back through an adjacent one of said lenses and a suitable screen acting to receive the moving image thereon.

11. A scanning apparatus consisting of a rotatable cylinder, a plurality of spherical lenses arranged in a helix on said cylinder, a stationary reflecting means adjacent said lenses for reflecting the light passing through one of said lenses back through an adjacent one of said lenses, a second stationary reflecting means acting to reflect said light through said helically arranged cylindrical lens upon a screen or photoelectric cell in order that light shall have a rapid transverse and a slow vertical motion thereon.

12. A scanning apparatus consisting of a rotatable element having a plurality of spherical lenses in stepped arrangement, a plurality of stationary reflecting means arranged adjacent said rotatable element for bending the optic axis of said apparatus through one lens back through an adjacent one of said lenses and back through still another adjacent lens, and a screen to receive said light.

13. A television apparatus consisting of an image casting device consisting of a plurality of movable optic elements associated with a plurality of stationary reflecting elements, whereof each of said optic elements successively projects an image and the remainder successively reproject the image cast by the preceding one due to the said reflectors acting to turn the optic axis of said optic elements repeatedly back to an adjacent optic element, and a light sensitive cell so positioned that the final image is traversed across it.

14. An optic apparatus consisting of a single rotatable medium bearing a plurality of distinct groups of optic elements one of said groups consisting of a series of spherical lenses and the other of said groups consisting of an image-shifting arrangement, means for passing light through one of said groups, and a plurality of stationary reflecting means for reflecting said light in turn through said groups successively, in order that each of said groups may produce its specific modification of said light, whereby the scanning speed of the image formed by said light is increased.

15. A scanning apparatus consisting of a single rotatable medium, a plurality of image forming elements borne on said medium, a stationary right angled transparent prism with its largest surface disposed parallel to said rotating medium and in the path of the light transmitted from said image forming means, said prism acting to reflect said light back through an adjacent image forming element on said rotating medium in order to explore said light while moving in a direction opposite to the motion thereof and a photoelectric cell upon which said image forming means reprojects and augments the speed of motion of said image.

16. A scanning apparatus consisting of a single rotatable medium, a plurality of image forming elements borne on said medium, a stationary reflecting means including two inclined reflecting surfaces placed adjacent to said rotating medium, the first of said surfaces being in the path of the light of the image formed by said image forming elements and acting to reflect said light upon the second of said reflecting surfaces which in turn reflects said light through an adjacent image forming element on said rotating medium and a stationary receiving element upon which the final image is reprojected and moved at an augmented speed.

17. A scanning apparatus consisting of a single rotatable medium, a plurality of image forming elements borne on said medium, a first inclined stationary reflecting surface in the path of the optic axis of said image forming elements and acting to deviate said optic axis, a second inclined stationary reflecting surface in the path of said deviated optic axis and causing it said deviated optic axis to traverse an adjacent image forming element on said rotating element, and an element upon which said reprojected image is received and moved at an accelerated speed.

18. A scanning apparatus consisting of a plurality of movable image forming elements arranged in image exploring relation and movable in the direction of exploration, a stationary transparent composite right angled prism placed with its longest surface parallel to the path of said image forming elements, said composite prism consisting of two juxtaposed similar prisms, the adjacent surfaces of said prisms constituting a diffusing screen, said composite prism acting to receive the movable image formed by said image-forming elements upon said adjacent surface and reflect the light from said image through an adjacent of said image forming elements, said light and said adjacent image forming element moving in opposite directions resulting in the speed of said light being augmented and a light receiving element upon which said light is received to obtain a series of images moving at a greater speed than that of the image forming elements.

19. A scanning apparatus consisting of a plurality of movable image forming elements arranged in and moving in the direction of image exploring relation, a first stationary inclined reflecting surface placed in the path of the optical axis for deflecting said optical axis, a diffusing or projecting screen placed at right angles to said deviated optical axis upon which the images of said image forming elements is produced and moved, a second stationary reflecting surface inclined and placed in the path of said deviated optical axis after its traversal of said screen and acting to secondarily deviate said optical axis to a direction parallel to its original direction and through an adjacent one of said image forming elements and a light receiving element in the path of said second deviated optical axis to produce an augmented speed of traversal of the image received on said light receiving element.

20. A television apparatus consisting of a movable member traversed by light beams, a plurality of image forming elements arranged on said movable medium to consecutively traverse said light beams to form images thereof, a first stationary inclined reflecting surface placed in the path of the light transmitted by each of said image forming elements consecutively and acting to deviate said transmitted light, a screen upon which said light is focussed to form said images, a second stationary inclined reflecting surface placed on the path of said light beyond said screen and acting to reflect said light back through an adjacent image forming element on said movable member to be explored thereby to form an additional image thereof and a light receiving means upon which said additional image is formed.

21. A television apparatus consisting of a movable member traversed by light beams, a plurality of image forming elements arranged on said movable medium to consecutively traverse said light beams to form images thereof, a first stationary inclined reflecting surface placed in the path of the light transmitted by each of said image forming elements consecutively and acting to deviate said transmitted light, a second stationary inclined reflecting surface placed in the path of said deviated light to reflect said light back through an adjacent image forming element on said movable member to be explored thereby to form an additional image thereof and a light receiving means upon which said additional image is formed.

ALOYSIUS J. CAWLEY.